(12) United States Patent
Giuliano

(10) Patent No.: US 10,680,513 B2
(45) Date of Patent: Jun. 9, 2020

(54) PUMP CAPACITOR CONFIGURATION FOR VOLTAGE MULTIPLIER

(71) Applicant: pSemi Corporation, San Diego, CA (US)

(72) Inventor: David Giuliano, Brookline, MA (US)

(73) Assignee: pSemi Corporation, San Diego, CA (US)

(*) Notice: Subject to any disclaimer, the term of this patent is extended or adjusted under 35 U.S.C. 154(b) by 0 days.

(21) Appl. No.: 16/221,925

(22) Filed: Dec. 17, 2018

(65) Prior Publication Data

US 2019/0123640 A1 Apr. 25, 2019

Related U.S. Application Data

(63) Continuation of application No. 14/646,809, filed as application No. PCT/US2013/071569 on Nov. 25, 2013, now abandoned, which is a continuation of application No. 13/685,186, filed on Nov. 26, 2012, now Pat. No. 8,693,224.

(51) Int. Cl.
*H02M 3/07* (2006.01)

(52) U.S. Cl.
CPC ........ *H02M 3/07* (2013.01); *H02M 2003/072* (2013.01)

(58) Field of Classification Search
CPC .................. H02M 2003/072; H02M 2003/075
USPC ................................ 363/59–60, 61; 327/536
See application file for complete search history.

(56) References Cited

U.S. PATENT DOCUMENTS

| | | | |
|---|---|---|---|
| 4,214,174 A | 7/1980 | Dickson | |
| 4,812,961 A | 3/1989 | Essaff et al. | |
| 5,095,223 A * | 3/1992 | Thomas | H02M 3/07 307/110 |
| 5,132,606 A | 7/1992 | Herbert | |
| 5,301,097 A | 4/1994 | McDaniel | |
| 5,737,201 A | 4/1998 | Meynard et al. | |
| 5,761,058 A | 6/1998 | Kanda et al. | |
| 5,801,987 A | 9/1998 | Dinh | |
| 5,907,484 A | 5/1999 | Kowshik et al. | |
| 5,978,283 A | 11/1999 | Hsu et al. | |

(Continued)

FOREIGN PATENT DOCUMENTS

| | | |
|---|---|---|
| CN | 101325369 | 12/2008 |
| EP | 2469694 | 6/2012 |

(Continued)

OTHER PUBLICATIONS

Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.

(Continued)

*Primary Examiner* — Harry R Behm

(74) *Attorney, Agent, or Firm* — Berkeley Law & Technology Group, LLP

(57) ABSTRACT

A cascade multiplier includes a switch network having switching elements, a phase pump, and a network of pump capacitors coupled with the phase pump and to the switch network. The network of pump capacitors includes first and second capacitors, both of which have one terminal DC coupled with the phase pump, and a third capacitor coupled with the phase pump through the first capacitor.

22 Claims, 13 Drawing Sheets

(56) References Cited

U.S. PATENT DOCUMENTS

| | | | |
|---|---|---|---|
| 6,107,864 A | 8/2000 | Fukushima | |
| 6,476,666 B1 | 11/2002 | Palusa et al. | |
| 6,486,728 B2 | 11/2002 | Kleveland | |
| 6,501,325 B1 | 12/2002 | Meng | |
| 6,504,422 B1 | 1/2003 | Rader et al. | |
| 6,759,766 B2 | 7/2004 | Hiratsuka et al. | |
| 6,927,441 B2 | 8/2005 | Pappalardo et al. | |
| 6,980,181 B2 | 12/2005 | Sudo | |
| 7,145,382 B2 | 12/2006 | Ker et al. | |
| 7,190,210 B2 | 3/2007 | Azrai et al. | |
| 7,224,062 B2 | 5/2007 | Hsu | |
| 7,239,194 B2 | 7/2007 | Azrai et al. | |
| 7,250,810 B1 | 7/2007 | Tsen | |
| 7,408,330 B2 | 8/2008 | Zhao | |
| 7,511,978 B2 | 3/2009 | Chen et al. | |
| 7,595,682 B2 | 9/2009 | Lin et al. | |
| 7,724,551 B2 | 5/2010 | Yanagida | |
| 7,741,898 B2 | 6/2010 | Hsu | |
| 7,777,459 B2 | 8/2010 | Williams | |
| 7,782,027 B2 | 8/2010 | Williams | |
| 7,786,712 B2 | 8/2010 | Williams | |
| 7,807,499 B2 | 10/2010 | Nishizawa | |
| 7,812,579 B2 | 10/2010 | Williams | |
| 7,928,705 B2 | 4/2011 | Hooijschuur et al. | |
| 7,999,601 B2 | 8/2011 | Schlueter et al. | |
| 8,018,216 B2 | 9/2011 | Kakehi | |
| 8,040,174 B2 | 10/2011 | Likhterov | |
| 8,048,766 B2 | 11/2011 | Joly et al. | |
| 8,111,054 B2 | 2/2012 | Yen et al. | |
| 8,159,091 B2 | 4/2012 | Yeates | |
| 8,193,604 B2 | 6/2012 | Lin et al. | |
| 8,212,541 B2 | 7/2012 | Perreault et al. | |
| 8,339,184 B2 | 12/2012 | Kok et al. | |
| 8,350,549 B2 | 1/2013 | Kitabatake | |
| 8,384,467 B1 | 2/2013 | O'Keeffe et al. | |
| 8,395,914 B2 | 3/2013 | Klootwijk et al. | |
| 8,456,874 B2 | 6/2013 | Singer et al. | |
| 8,503,203 B1 | 8/2013 | Szczeszynski et al. | |
| 2002/0163376 A1* | 11/2002 | Pappalardo | H02M 3/07 327/536 |
| 2003/0169096 A1 | 9/2003 | Hsu et al. | |
| 2003/0227280 A1 | 12/2003 | Vinciarelli | |
| 2004/0041620 A1 | 3/2004 | D'Angelo et al. | |
| 2004/0080964 A1 | 4/2004 | Buchmann | |
| 2005/0007184 A1 | 1/2005 | Kamijo | |
| 2005/0007185 A1 | 1/2005 | Kamijo | |
| 2005/0207133 A1 | 9/2005 | Pavier et al. | |
| 2007/0155357 A1* | 7/2007 | Rizzo | G06K 19/0713 455/343.1 |
| 2007/0210774 A1 | 9/2007 | Kimura et al. | |
| 2007/0230221 A1 | 10/2007 | Lim et al. | |
| 2008/0150621 A1 | 6/2008 | Lesso et al. | |
| 2008/0157732 A1 | 7/2008 | Williams | |
| 2008/0157733 A1 | 7/2008 | Williams | |
| 2008/0239772 A1 | 10/2008 | Oraw et al. | |
| 2009/0102439 A1 | 4/2009 | Williams | |
| 2009/0257211 A1 | 10/2009 | Kontani et al. | |
| 2009/0278520 A1 | 11/2009 | Perreault et al. | |
| 2009/0322384 A1 | 12/2009 | Oraw | |
| 2010/0110741 A1 | 5/2010 | Lin et al. | |
| 2010/0135052 A1 | 6/2010 | Luerkens | |
| 2010/0140736 A1 | 6/2010 | Lin et al. | |
| 2010/0156512 A1* | 6/2010 | Chaoui | H02M 3/07 327/536 |
| 2010/0202161 A1 | 8/2010 | Sims et al. | |
| 2010/0214746 A1 | 8/2010 | Lotfi et al. | |
| 2010/0244189 A1 | 9/2010 | Klootwijk et al. | |
| 2010/0244585 A1 | 9/2010 | Tan et al. | |
| 2011/0062940 A1 | 3/2011 | Shvartsman | |
| 2011/0163414 A1 | 7/2011 | Lin et al. | |
| 2011/0273151 A1 | 11/2011 | Lesso et al. | |
| 2011/0304310 A1 | 12/2011 | Sotono | |
| 2012/0146177 A1 | 6/2012 | Choi et al. | |
| 2012/0153912 A1* | 6/2012 | Demski | H02M 3/07 323/282 |
| 2012/0313602 A1 | 12/2012 | Perreault et al. | |
| 2012/0326684 A1 | 12/2012 | Perreault et al. | |
| 2013/0049714 A1 | 2/2013 | Chiu | |
| 2013/0094157 A1 | 4/2013 | Giuliano | |
| 2013/0154600 A1 | 6/2013 | Giuliano | |
| 2013/0229841 A1 | 9/2013 | Giuliano | |

FOREIGN PATENT DOCUMENTS

| | | |
|---|---|---|
| JP | 10327573 | 12/1998 |
| JP | 11235053 | 8/1999 |
| JP | 2010045943 A | 2/2010 |
| TW | 263230 | 10/2006 |
| TW | 293828 | 2/2008 |
| WO | 2006093600 | 9/2006 |
| WO | 2009112900 | 9/2009 |
| WO | 2012151466 | 11/2012 |
| WO | 2013059446 | 4/2013 |
| WO | 2013096416 | 6/2013 |

OTHER PUBLICATIONS

Axelrod et al. "Single-switch single-stage switched-capacitor buck converter", *Proc. of NORPIE 2004, 4th Nordic Workshop on Power and Industrial Electronics*, Jun. 2004.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

Lei et al. "Analysis of Switched-capacitor DC-DC Converters in Soft-charging Operation" *14th IEEE Workshop on Control and Modeling for Power Electronics*, pp. 1-7, Jun. 23, 2013.

Meynard et al. "Multi-Level Conversion: High Voltage Choppers and Voltage-Source Inverters," *IEEE Power Electronics Specialists Conference*, pp. 397-403, 1992.

Middlebrook, "Transformerless DC-to-DC Converters with Large Conversion Ratios" *IEEE Transactions on Power Electronics*, vol. 3, No. 4, pp. 484-488, Oct. 1988.

Ng et al. "Switched Capacitor DC-DC Converter: Superior where the Buck Converter has Dominated" *PhD Thesis, UC Berkeley*, Aug. 17, 2011.

Pilawa-Podgurski et al. "Merged Two-Stage Power Converter Architecture with Soft Charging Switched-Capacitor Energy Transfer" *39th IEEE Power Electronics Specialists Conference*, 2008.

Pilawa-Podgurski et al. "Merged Two-Stage Power Converter with Soft Charging Switched-Capacitor Stage in 180 nm CMOS," *IEEE Journal of Solid-State Circuits*, vol. 47, No. 7, pp. 1557-1567, Jul. 2012.

Sun et al. "High Power Density, High Efficiency System Two-Stage Power Architecture for Laptop Computers", *Power Electronics Specialists Conference*, pp. 1-7, Jun. 2006.

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Wood et al, "Design, Fabrication and Initial Results of a 2g Autonomous Glider" *IEEE Industrial Electronics Society*, pp. 1870-1877, Nov. 2005.

\* cited by examiner

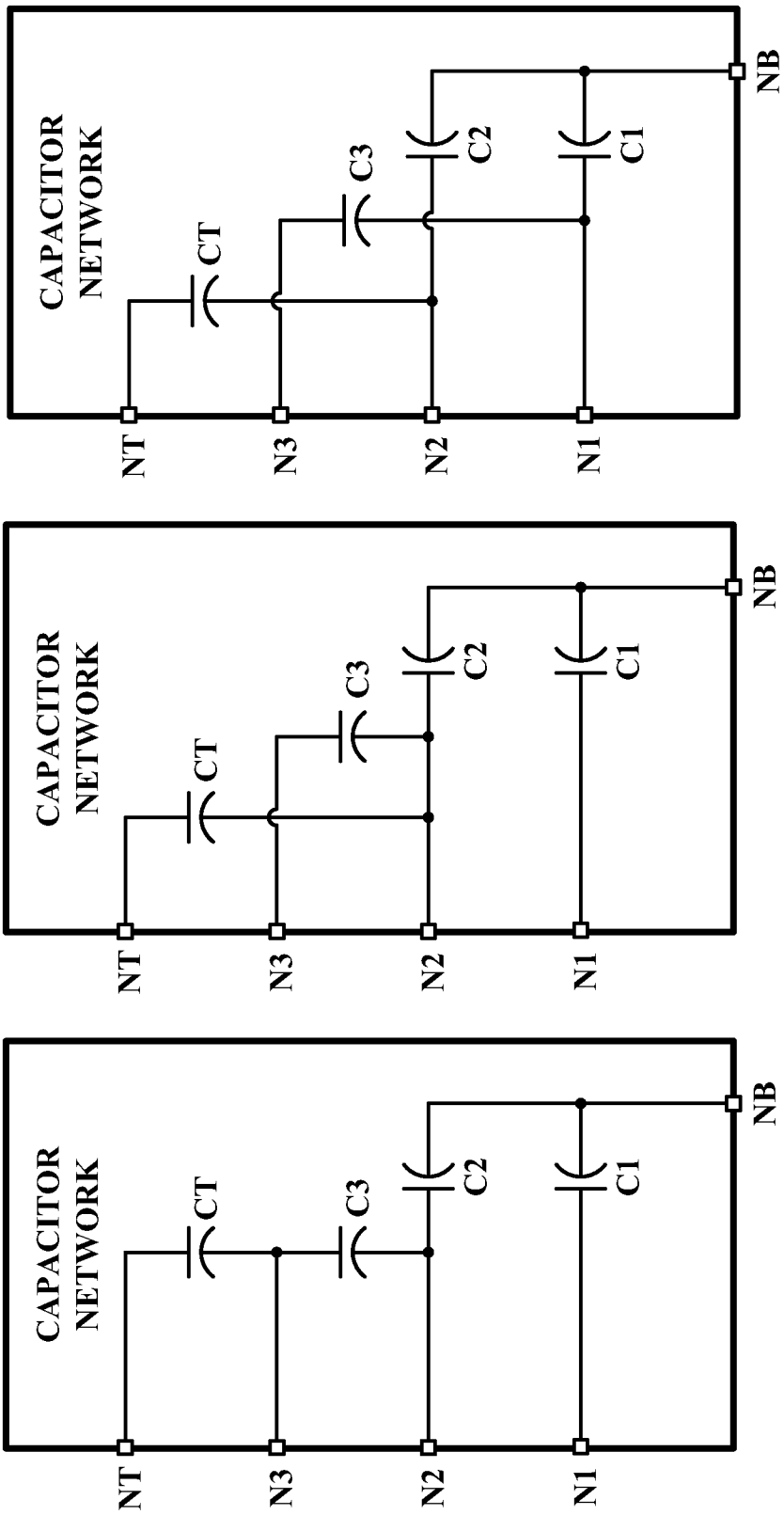

PUMP CAPACITOR CONFIGURATION FOR VOLTAGE MULTIPLIER

CROSS REFERENCE TO RELATED APPLICATION

This application is a continuation of U.S. application Ser. No. 14/646,809, filed on May 22, 2015, which is the national phase under 35 USC 371 of international application no. PCT/US2013/071569, filed Nov. 25, 2013, which claims the benefit of the priority date of U.S. application Ser. No. 13/685,186, filed Nov. 26, 2012, now U.S. Pat. No. 8,693,224. The contents of the aforementioned applications are incorporated herein in their entirety.

FIELD OF DISCLOSURE

The present inventive subject matter relates to switched capacitor converters for converting between different voltages.

BACKGROUND

Power converters may generally include switches and one or more capacitors. Such converters are used, for example, to power portable electronic-devices and consumer electronics.

A switch-mode power converter is a specific type of power converter that regulates an output voltage or current by switching energy-storage elements (i.e., inductors and capacitors) into different electrical configurations using a switching network.

A switched capacitor converter is a type of switch-mode power converter that primarily uses capacitors to transfer energy. In such converters, the number of capacitors and switches increases as the transformation ratio increases.

Switches in the switching network are usually active devices that are implemented with transistors. The switching network may be integrated on a single semiconductor substrate or on multiple monolithic semiconductor substrates. Alternatively, the switching network may be formed using discrete devices. Furthermore, because a switch normally carries a large current, it may be composed of numerous smaller switches in parallel.

SUMMARY

In one aspect, the invention features a switching network that interconnects capacitors in a capacitor network that comprises a plurality of capacitors to cause a voltage at a first port thereof to be a multiple of a voltage at a second port thereof. Among the capacitors of the are a first capacitor, a second capacitor, and a third capacitor. Throughout operation of the switching network, the first capacitor has a positive terminal, or "anode," that remains DC coupled to a first node, the second capacitor has a positive terminal that is DC coupled to a second node, the third capacitor has a negative terminal, or "cathode," that remains DC coupled to the positive terminal of the second capacitor and a positive terminal that remains DC coupled to a third node, and the first and second capacitors have negative terminals that remain DC coupled to a fourth node that is one of the second port and a phase pump. The negative terminal of the third capacitor is coupled to the fourth node without being DC coupled to the fourth node.

Among the embodiments are those in which the capacitor network further comprises a fourth capacitor having a negative terminal that remains DC coupled to the positive terminal of the third capacitor and a positive terminal that, during operation of the switching network, remains DC coupled to a fifth node.

Also among the embodiments are those in which the capacitor network further comprises a fourth capacitor having a negative terminal that is DC coupled to the positive terminal of the second capacitor and a positive terminal that is DC coupled to a fifth node.

In yet other embodiments, the capacitor network further comprises a fourth capacitor having a negative terminal that is DC coupled to the positive terminal of the first capacitor and a positive terminal that is DC coupled to a fifth node.

In some embodiments, the capacitor network and the switches define a single-phase voltage multiplier, wherein the apparatus further comprises a controller to generate control signals for the switches. In others, it defines a multi-phase voltage multiplier, such as a two-phase voltage multiplier. These embodiments also include a controller to generate control signals for the switches.

Still other embodiments feature a switching network in which some switches implement a phase pump that causes charge to be shuttled along the switching network as the capacitor network is repeatedly charged and discharged by the phase pump.

Yet other embodiments are those in which the capacitor network comprises a pump capacitor network that causes voltage transformation between the first and second ports and a DC capacitor network that serves as intermediate storage for the pump capacitor network.

In some embodiments, the negative terminal of the third capacitor has a negative terminal that is DC coupled to the second node.

In another aspect, the invention features a voltage multiplier that is configured to cause a voltage at a first port thereof to be a multiple of a voltage at a second port thereof. The voltage multiplier includes a first plurality of switches, a first phase-pump, and a plurality of capacitors. The plurality of capacitors, which is coupled to the first phase-pump, has a first capacitor-network that has at least three capacitors, each of which has a first terminal and a second terminal. The first terminals of the capacitors are coupled to selected nodes between pairs of the switches. The first plurality of switches includes a first switch having a terminal that is connected to the first port and a second switch having a terminal that is connected to the second port. There also exists a first bottom-node that is either the first phase-pump or the second port. Throughout operation of the voltage multiplier, a first capacitor of the three capacitors remains coupled to the first bottom-node through the second capacitor, a second terminal of a second of the three capacitors remains DC coupled to the first bottom-node, and a second terminal of a third of the three capacitors remains DC coupled to the first bottom-node.

In some embodiments, the second terminals of the second capacitor and third capacitors are negative terminals. Throughout operation of the voltage multiplier, a negative terminal of the first capacitor remains DC coupled to a positive terminal of the second capacitor.

In some embodiments, the first terminals are all positive terminals and the second terminals are all negative terminals.

Yet other embodiments include a controller configured for causing selected switches from the first plurality of switches to open and close to cause the voltage at the first port to be a multiple of the voltage at the second port.

Embodiments first include those in which the voltage multiplier is a single-phase voltage multiplier and those in which it is a multi-phase voltage multiplier, and in particular, a two-phase multiplier.

Embodiments further include those in which the first bottom-node is the phase pump and those in which it is the second port.

In other embodiments, the plurality of capacitors includes a second capacitor-network. In such embodiments, the voltage multiplier further includes a second phase pump coupled to the second capacitor-network. Among these are embodiments in which the second capacitor-network includes a set of capacitors, each capacitor having a first terminal and a second terminal, the first terminals being coupled to corresponding ones of selected nodes between pairs of the switches. This set of capacitors includes first and second capacitors, second terminals of which are DC coupled to the second phase-pump, and a third capacitor coupled to the second phase-pump through the first capacitor.

Other embodiments include those in which the voltage multiplier further includes a second plurality of switches, one of which is coupled to the first port and another of which is coupled to the second port. The second plurality of switches includes a first switch having a first terminal and a second terminal and a second switch having a first terminal and a second terminal. The first terminal of the second switch is coupled to the second terminal of the first switch. The voltage multiplier also includes a third capacitor-network network and a third-phase pump. Among these embodiments are those in which third capacitor-network includes a set of capacitors, each capacitor having a first terminal and a second terminal, the first terminals being coupled to corresponding ones of selected nodes between pairs of the switches from the second plurality of switches, wherein the set of capacitors from the third charge storage network includes first and second capacitors, second terminals of which are DC coupled to the third phase pump, and a third capacitor coupled to the third phase pump through the first capacitor.

DESCRIPTION OF THE FIGURES

The foregoing features of the circuits and techniques described herein, may be more fully understood from the following description of the figures in which:

FIGS. 4A-4C show various capacitor network configurations;

DETAILED DESCRIPTION

This disclosure describes a method of controlling the voltage stress of the capacitors within a cascade multiplier type switched capacitor converter.

Figure 1A:
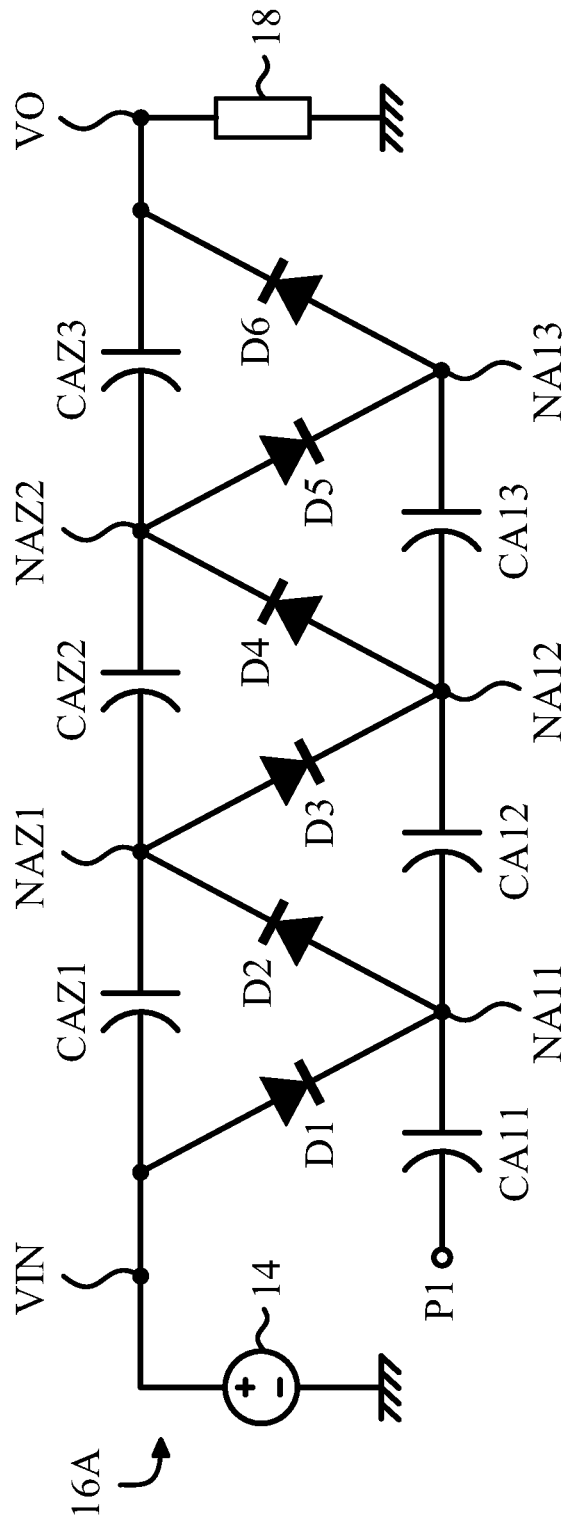
FIGS. 1A-1B shows cascade multipliers.

FIG. 1A shows a cascade multiplier 16A that receives an input voltage VIN from a voltage source 14 and produces an output voltage VO that is four times the input voltage VIN. Assuming that the input voltage VIN is equal to one volt, the operation of the cascade multiplier 16A illustrated in FIG. 1A is described as follows.

A clock with first and second clock intervals generates a voltage at a pump node P1 at a pre-defined frequency. This clock controls charge transfer from the voltage source 14 to a load 18. In the example shown in FIG. 1A, it takes three iterations of the first and second clock intervals for the initial charge from the voltage source 14 to reach the load 18.

During the first clock-interval, the voltage at the pump node P1 is zero volts and odd-labeled diodes D1, D3, D5 conduct current. As a result, charge is transferred from the voltage source 14 to a first pump-capacitor CA11, from a first DC-capacitor CAZ1 to a second pump-capacitor CA12, from a second DC-capacitor CAZ2 to a third pump-capacitor CA13, and from a third DC capacitor CAZ3 to the load 18.

During the second clock-interval, the voltage at the pump node P1 is one volt and even-labeled diodes D2, D4, D6 conduct current. Consequently, charge is transferred from the first pump-capacitor CA11 to the first DC capacitor CAZ1, from the second pump-capacitor CA12 to the second DC capacitor CAZ2, and from the third pump-capacitor CA13 to the third DC capacitor CAZ3 and the load 18.

The voltage at a first switch-node NA11 alternates between one volt and two volts, the voltage at a second switch-node NA12 alternates between two volts and three volts, and the voltage at a third switch-node NA13 alternates between three volts and four volts. As a result, there is a difference of one volt across each of the pump capacitors CA11-CA13. Meanwhile, the voltage at a first DC-node NAZ1 is two volts and the voltage at a second DC-node NAZ2 is three volts. This causes a difference of one volt across each of the DC capacitors CAZ1-CAZ3.

In general, the maximum voltage across each of the pump capacitors CA11-CA13 and DC capacitors CAZ1-CAZ3 in the cascade multiplier 16A is equal to the input voltage VIN, assuming that the peak voltage at the pump node P1 is the input voltage VIN.

Figure 1B:
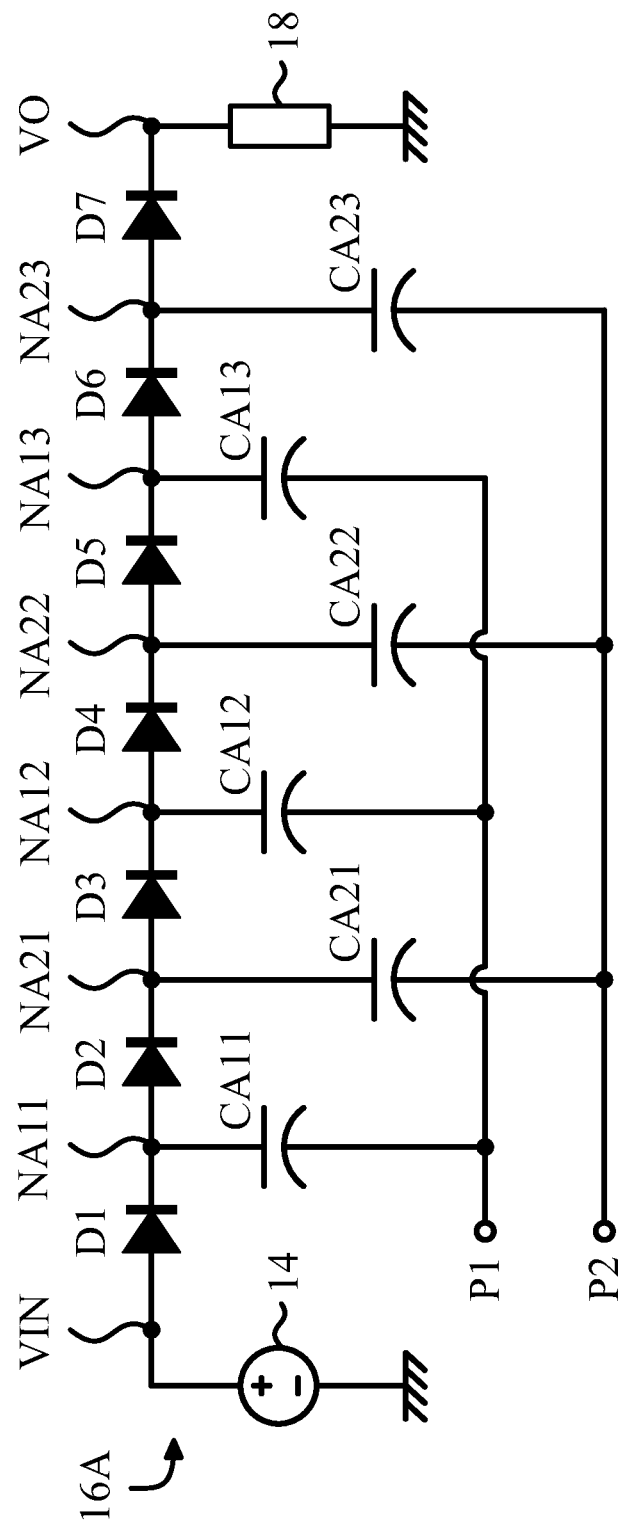

FIG. 1B shows a cascade multiplier 16A that receives an input voltage VIN from a voltage source 14 and produces an output voltage VO that is seven times the input voltage VIN. Assuming the input voltage VIN is equal to one volt, the operation of the cascade multiplier 16A illustrated in FIG. 1B is described as follows.

A first clock generates a voltage at a first pump-node P1 and a second clock generates a voltage at a second pump-node P2. The first clock and the second clock are one hundred and eighty degrees out of phase with each other. These clocks are responsible for controlling the transfer of charge from the voltage source 14 to a load 18. In the illustrated example, it takes four iterations of the first and second clock intervals for the initial charge from the voltage source 14 to reach the load 18.

During the first clock-interval, the voltage at the first pump-node P1 is zero volts, the voltage at the second pump-node P2 is one volt, and odd labeled diodes D1, D3, D5, D7 conduct current. As a result, charge is transferred from the voltage source 14 to a first pump-capacitor CA11, from a second pump-capacitor CA21 to a third pump-capacitor CA12, from a fourth pump-capacitor CA22 to a fifth pump-capacitor CA13, and from a sixth pump capacitor CA23 to the load 18.

During the second clock-interval following the first clock interval, the voltage at the first pump-node P1 is one volt, the voltage at the second pump-node P2 is zero volts, and even labeled diodes D2, D4, D6 conduct current. Consequently, charge is transferred from the first pump-capacitor CA11 to the second pump-capacitor CA21, from the third pump-capacitor CA12 to the fourth pump-capacitor CA22, and from the fifth pump-capacitor CA13 to the sixth pump capacitor CA23.

The voltage at a first switch-node NA11 alternates between one volt and two volts, the voltage at a second switch-node NA12 alternates between three volts and four volts, and the voltage at a third switch-node NA13 alternates between five volts and six volts. This results in a difference of one volt, two volts, three volts, four volts, five volts, and six volts across pump capacitors CA11, CA21, CA12, CA22, CA13, CA23, respectively. Consequently, there is a different voltage across each pump capacitor.

Assuming, the peak voltage at the first and second pump-nodes P1, P2 is the input voltage VIN. The minimum voltage stress is across the first pump-capacitor CA11 and equal to the input voltage VIN. While the maximum voltage stress is across the sixth pump capacitor CA23 and equal to six times the input voltage VIN.

Because different capacitors experience different voltage stresses, it is sometimes necessary to construct them differently. However, in the case of lumped capacitors, this increases supply-chain complexity. In the case of integrated capacitors, which have been integrated into a monolithic integrated circuitry, this increases processing costs.

On the other hand, a low voltage capacitor stores less energy than a high voltage capacitor. For example, a cascade multiplier 16A with a series-stacked pump capacitor configuration as in FIG. 1A would require a larger amount of total capacitance to achieve the same efficiency as a cascade multiplier 16A with a parallel stacked pump capacitor configuration as in FIG. 1B.

The circuit topology disclosed herein provides flexibility for controlling distribution of voltage stress among the capacitors along with the maximum and minimum voltage stress across the capacitors.

The distribution of voltage stress among the capacitors along with the maximum and minimum voltages stress across the capacitors is a function of the type of cascade multiplier and capacitor network configuration.

For example, stacking the pump capacitors CA11-CA13 in series as shown in FIG. 1A causes a voltage stress that is uniform and equal among the pump capacitors CA11-CA13. In contrast, stacking the pump capacitors CA11-CA13 in parallel as shown in FIG. 1B causes the voltage stress to be non-uniform and unequal among the pump capacitors CA11-CA13.

Before describing several exemplary embodiments of cascade multipliers, it should be appreciated that in an effort to promote clarity in explaining the concepts, references are sometimes made herein to specific cascade multipliers. It should be understood that such references are merely exemplary and should not be construed as limiting. After reading the description provided herein, one of ordinary skill in the art will understand how to apply the concepts described herein to provide specific cascade multipliers.

It should be appreciated that reference is also sometimes made herein to particular input voltages and output voltages as well as to particular transformation voltage ratios. It should be understood that such references are merely exemplary and should not be construed as limiting.

Reference may also sometimes be made herein to particular applications. Such references are intended merely as exemplary and should not be taken as limiting the concepts described herein to the particular application.

Thus, although the description provided herein explains the inventive concepts in the context of particular circuits or a particular application or a particular voltage, those of ordinary skill in the art will appreciate that the concepts equally apply to other circuits or applications or voltages.

Embodiments described herein rely at least in part on the recognition that within the cascade multiplier family, the capacitors can be configured such that the distribution of voltage stress among the capacitors is controlled along with the maximum and minimum voltage stress across the capacitors. This is achieved by creating combinations of the series capacitor network configuration and the parallel capacitor network configuration.

Figure 2C:
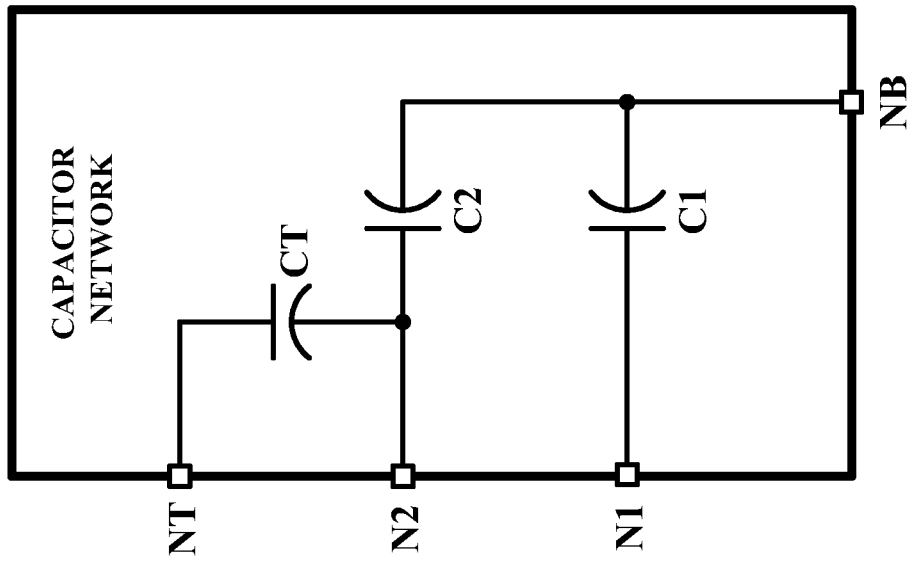
FIG. 2C shows a capacitor network configuration.
Figure 2B:
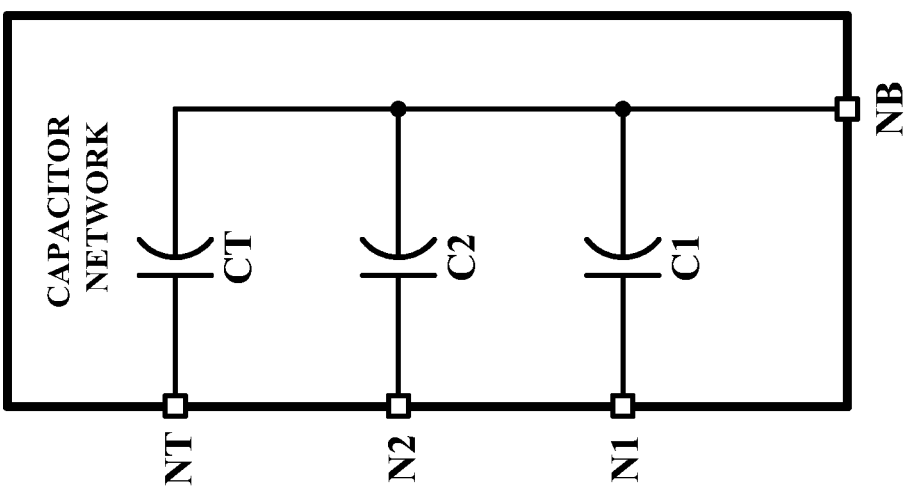
FIG. 2B shows a parallel-capacitor network configuration.
Figure 2A:
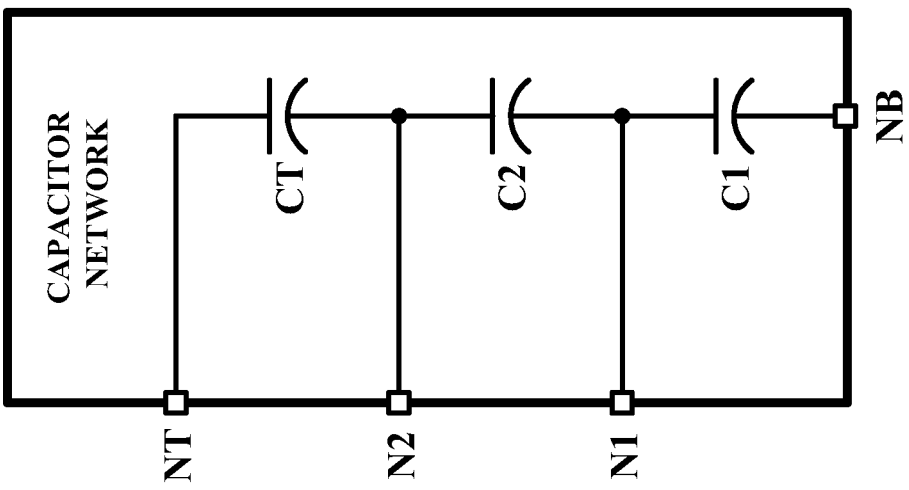
FIG. 2A shows a series-capacitor network configuration.

In FIG. 1A, the pump capacitors CA11-CA13 can be grouped together into a capacitor network. Likewise, the DC capacitors CAZ1-CAZ3 can be grouped together into a capacitor network. In general, a cascade multiplier 16A includes two or more capacitor networks. Three different capacitor networks are shown in FIGS. 2A-2C. Each capacitor network includes three capacitors C1, C2, CT, a bottom node NB, a top node NT, and intermediate nodes N1, N2.

The use of the word "coupled" implies that the elements may be directly connected together or may be coupled through one or more intervening elements, such as a resistor, capacitor, or switch. Furthermore, in DC coupling, DC signals are allowed to pass.

In FIG. 2A, the capacitors are connected in series. As used herein, a "series-capacitor" network configuration only includes one capacitor with a terminal DC coupled with the bottom node NB. An example of a series-capacitor network configuration is shown in FIG. 1A, where the pump capacitors CA11-CA13 are connected in series with pump node P1.

In contrast, the capacitors in FIG. 2B are connected in parallel. As used herein, a "parallel-capacitor" network configuration only includes capacitors that have a terminal that is DC coupled with the bottom node NB. An example of a parallel capacitor network configuration is shown in FIG. 1B, where the pump capacitors CA11-CA13 are connected in parallel with pump node P1.

FIG. 2C shows an embodiment of a capacitor network with three capacitors. The embodiment shown in FIG. 2C includes a first capacitor C1 coupled between a first intermediate node N1 and a bottom node NB, a second capacitor C2 coupled between a second intermediate node N2 and the bottom node NB, and a top capacitor CT coupled between a top node NT and the second intermediate node N2.

In general, a capacitor network includes a set of capacitors, a top node NT, a bottom node NB, and a set of intermediate nodes. The top node NT is at the highest electrical potential, the bottom node NB is at the lowest electrical potential, and the intermediate nodes are at electrical potentials in between that of the top node NT and that of the bottom node NB. Furthermore, the top and bottom nodes NT, NB are coupled to nodes that are either at one state or that alternate between two states, whereas the intermediate nodes are coupled to nodes that alternate between two states.

Figure 3:
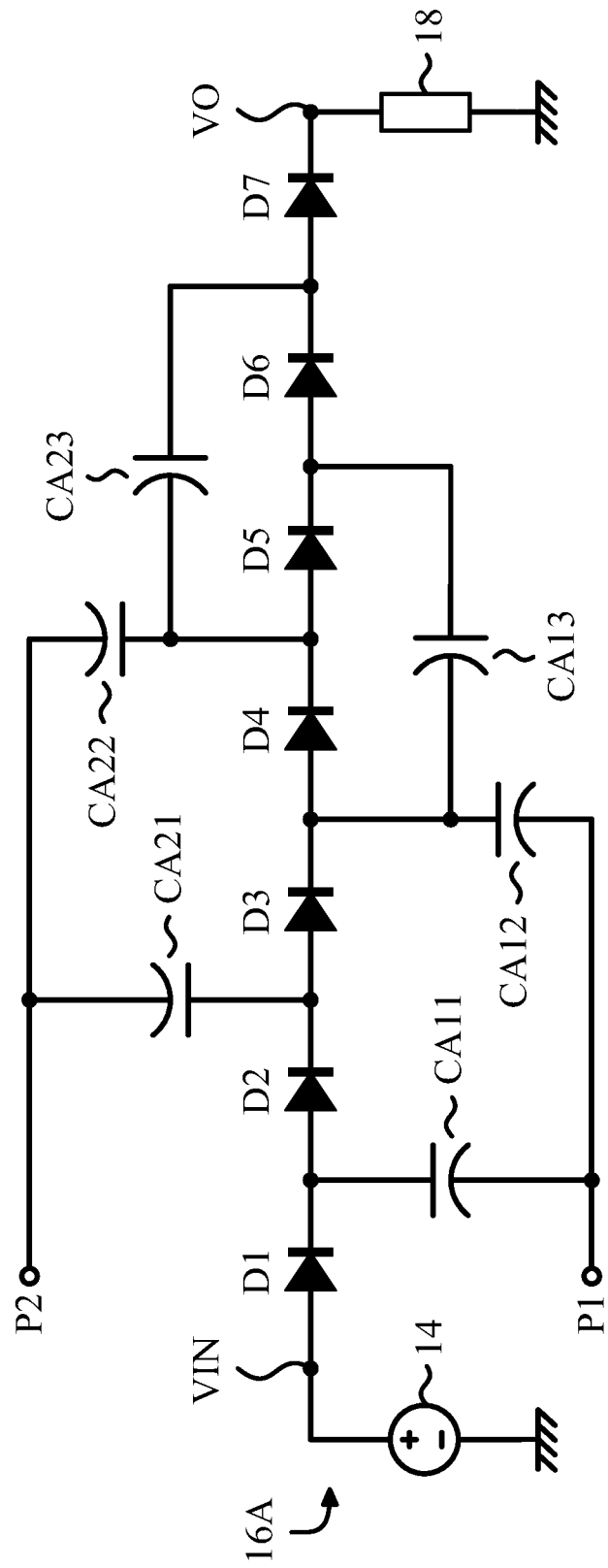
FIG. 3 shows a cascade multiplier with the capacitor network configuration in FIG. 2C.

FIG. 3 shows a cascade multiplier 16A that uses the capacitor network from FIG. 2C. The cascade multiplier 16A is constructed by replacing the first set of pump capacitors CA11-CA13 in FIG. 1B with the capacitor network shown in FIG. 2C and by replacing the second set of pump capacitors CA21-CA23 in FIG. 1B with the pump capacitor network shown in FIG. 2C.

The operation of the cascade multiplier 16A in FIG. 3 is similar to that described in connection with FIG. 1B. The voltage stresses across the pump capacitors CA11, CA12, CA13 are one volt, three volts, and two volts, respectively. Similarly, the voltage stresses across the pump capacitors CA21, CA22, CA23 are two volts, four volts, and two volts, respectively. Therefore, the maximum voltage stress across any pump capacitor in FIG. 3 is four volts. This is lower than the maximum voltage stress of six volts in FIG. 1B.

FIGS. 4A-4C show embodiments with more capacitors. In these embodiments, each capacitor network includes four capacitors C1, C2, C3, CT, a top node NT, a bottom node NB and three intermediate nodes N1-N3. Furthermore, the intermediate nodes N1, N2, N3 and the top node NT are coupled with the positive terminals of capacitors C1, C2, C3, CT, respectively.

In FIG. 4A, the capacitor network includes a first capacitor C1 coupled between a first intermediate node N1 and a bottom node NB, a second capacitor C2 coupled between a second intermediate node N2 and the bottom node NB, a third capacitor C3 coupled between a third intermediate node N3 and the second switch-node N2, and a top capacitor CT coupled between a top node NT and the third intermediate node N3.

In FIG. 4B, the capacitor network includes a first capacitor C1 coupled between a first intermediate node N1 and a bottom node NB, a second capacitor C2 coupled between a second intermediate node N2 and the bottom node NB, a third capacitor C3 coupled between a third intermediate node N3 and the second intermediate node N2, and a top capacitor CT coupled between a top node NT and the second intermediate node N2.

In FIG. 4C, the capacitor network includes a first capacitor C1 coupled between a first intermediate node N1 and a bottom node NB, a second capacitor C2 coupled between a second intermediate node N2 and the bottom node NB, a third capacitor C3 coupled between a third intermediate node N3 and the first intermediate node N1, and a top capacitor CT coupled between a top node NT and the second intermediate node N2.

Generally, the positive terminal (i.e., the "anode") of each capacitor in the capacitor network is couples to a top node NT or an intermediate node. For example, the positive terminal of a top capacitor CT is couples to the top node NT, the positive terminal of a first capacitor C1 is couples to a first intermediate node N1, the positive terminal of a second capacitor C2 is couples to a second intermediate node N2, and so on. The negative terminal (i.e., the "cathode") of each capacitor in the capacitor network is couples to any other capacitor terminal within the capacitor network that is at a lower voltage than its positive terminal.

In addition to the three previously described preferred embodiments shown in FIGS. 4A-4C, there are numerous other possible configurations of the capacitor network with four capacitors. The number of possible configurations of the capacitor network is N!, where N is the number of capacitors in the capacitor network. This includes the series case shown in FIG. 2A and the parallel case shown in FIG. 2B. Therefore, the number of capacitor network configurations having the properties shown in FIG. 2C is two less than N!.

FIGS. 5A-8A show an additional cascade multiplier 16A. A particular implementation of each cascade multiplier 16A that uses the topology shown in FIG. 2C is shown in FIG. 5B-8B. In each implementation, the pump capacitor networks 24A, 24B, 26A, 26B use one of the four capacitor networks shown in FIG. 2C and FIG. 4A-4C. Furthermore, the DC capacitor network 28A in FIG. 5B uses the capacitor network shown in FIG. 4A.

Figure 5A:
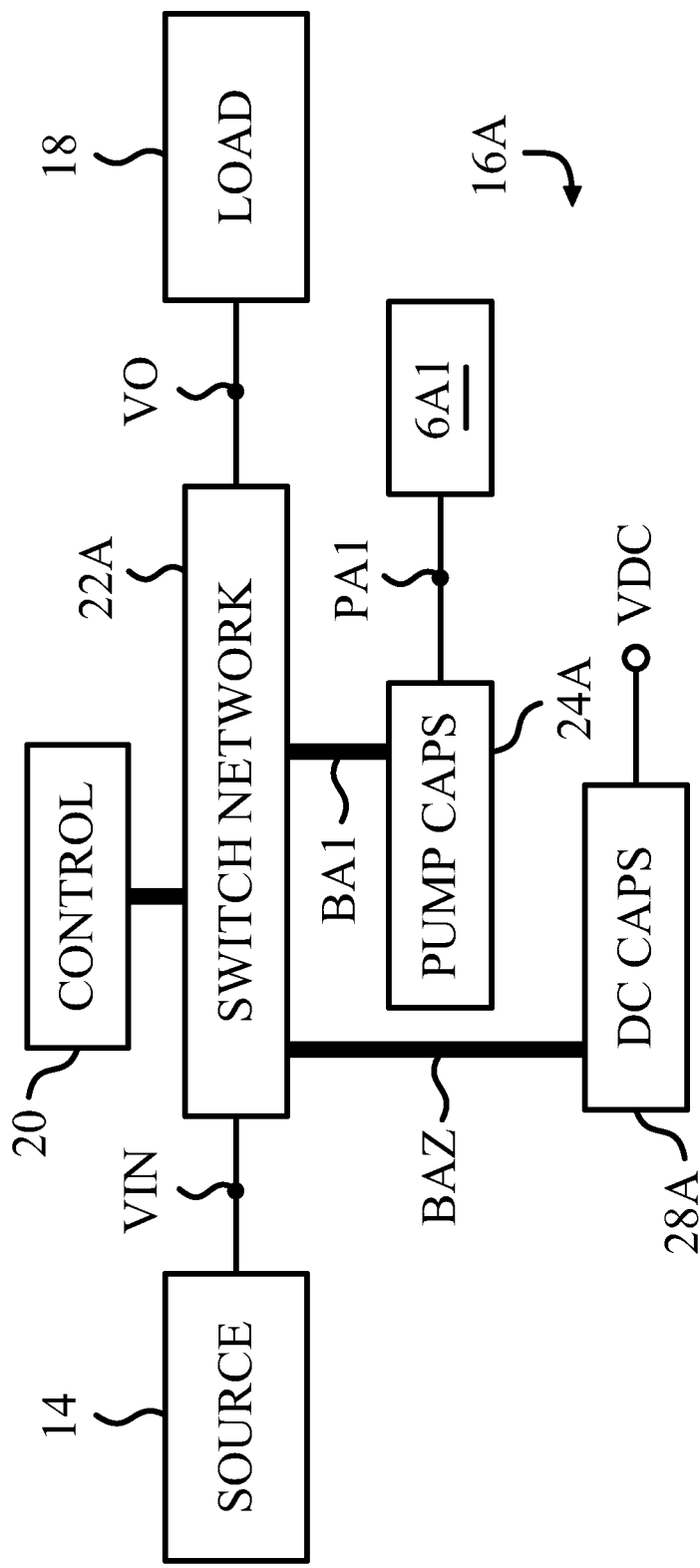
FIG. 5A shows a block diagram of a single-phase cascade multiplier.

A block diagram of a single-phase cascade multiplier 16A that includes the circuit in FIG. 1A as one species is illustrated in FIG. 5A. The single-phase cascade multiplier 16A includes at least four components: a switch network 22A, a pump capacitor network 24A, a DC capacitor network 28A, and a phase pump 6A1. Additionally, a controller 20 may be used to generate the appropriate control signals.

The input of the switch network 22A couples to a voltage source 14 while the output of the switch network 22A couples to a load 18. The switch network 22A includes a string of switches connected in series. At least one capacitor couples to a node between adjacent switches in the switch network 22A.

In the pump capacitor network 24A, one side of each pump capacitor is coupled with the switch network 22A through a pump bus BA1. The other side of each pump capacitor is coupled with the phase pump 6A1 at a pump node PAL Similarly, in the DC capacitor network 28A, one side of each DC capacitor is coupled with the switch network 22A through a DC bus BZA. The other side of each DC capacitor is coupled with a DC voltage. One convenient choice of a DC voltage comes from the output of the cascade multiplier 16A.

The phase pump 6A1 has a first state and a second state. In the first state, the output of the phase pump 6A1 is low and in the second state, the output of the phase pump 6A1 is high. During operation, the phase pump 6A1 cycles between the first state and the second state at a specific frequency.

The switch network 22A and phase pump 6A1 are synchronized such that packages of charge are shuttled along the switch network 22A as the pump capacitor network 24A is repeatedly being charged and discharged by the phase pump 6A1. Charge transfers back and forth between the pump capacitor network 24A and the DC capacitor network 28A. It takes multiple cycles for the initial charge from the voltage source 14 to reach the load 18. The pump capacitor network 24A provides the voltage transformation, whereas, the DC capacitor network 28A serves as intermediate storage for the pump capacitor network 24A.

The single-phase cascade multiplier 16A shown in FIG. 5A is a generalization of the cascade multiplier 16A in FIG. 1A. Each component in FIG. 5A corresponds to a counterpart in FIG. 1A. The switch network 22A in FIG. 5A corresponds to the series connection of diodes D1-D6 in FIG. 1A. The pump capacitor network 24A in FIG. 5A corresponds to the series configuration of pump capacitors CA11-CA13 in FIG. 1A. The DC capacitor network 28A in FIG. 5A corresponds to the series configuration of DC capacitors CZ1-CZ3 in FIG. 1A. Additionally, the phase pump 6A1 in FIG. 5A is not shown in FIG. 1A.

The diodes D1-D6 in FIG. 1A can be replaced by switches under the following circumstance. The switches are turned on when their corresponding diodes would have allowed current to flow and turned off when their corresponding diodes would have suppressed current flow. As used herein, the suppression of current means that the flow of current is either eliminated or attenuated.

Figure 5B:
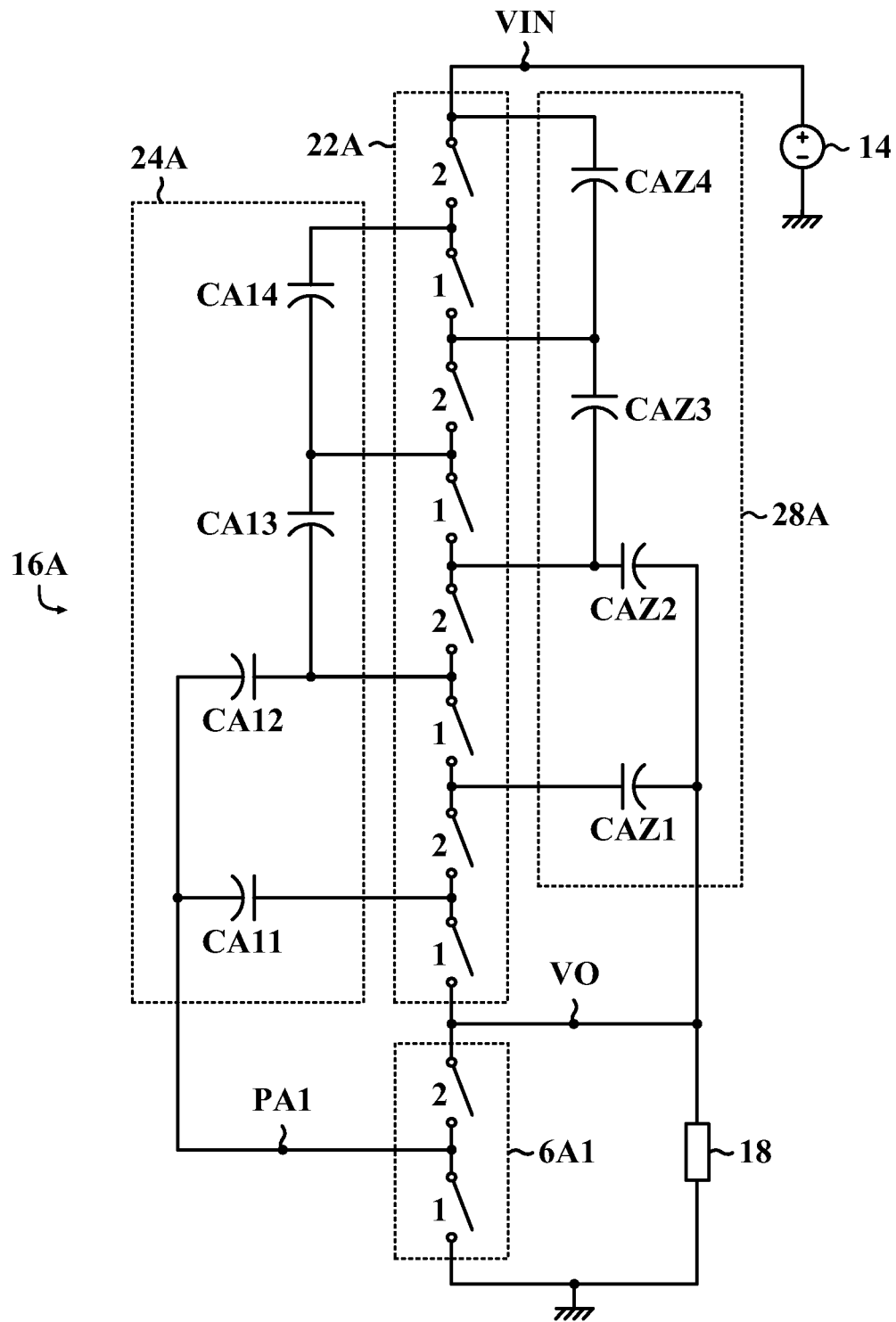
FIG. 5B shows a particular implementation of the cascade multiplier shown in FIG. 5A.

FIG. 5B is an implementation of the cascade multiplier 16A illustrated more generally in FIG. 5A.

The cascade multiplier 16A receives an input voltage VIN from the voltage source 14 and produces an output voltage VO that is one-fifth of the input voltage VIN. The pump capacitor network 24A and the DC capacitor network 28A utilize the capacitor network configuration shown in FIG. 4A. The pump capacitor network 24A includes first, second, third, and fourth pump-capacitors CA11, CA12, CA13, CA14 that are responsible for providing voltage transformation. In contrast, the DC capacitor network 28A includes first, second, third, and fourth DC capacitors CAZ1, CAZ2, CAZ3, CAZ4 that are responsible for generating DC voltage levels.

All of the devices in the switch network 22A and phase pump 6A1 are implemented using switches. The phase pump 6A1 cycles between a first interval and a second interval at a specific frequency. The voltage at the pump node PA1 during the first interval is ground. In contrast, the voltage at the pump node PA1 during the second interval is the output voltage VO.

Assuming the input voltage VIN is equal to five volts, the operation of the circuit is as follows. During the first interval, the switches labeled "1" are closed, the switches labeled "2" are open, and the voltage at the pump node PA1 is zero volts. As a result, the pump capacitors CA11-CA14 are being discharged while the DC capacitors CAZ1-CAZ4 are being charged.

During the second interval following the first interval, the switches labeled "1" are open, the switches labeled "2" are closed, and the voltage at the pump node PA1 is one volt. Consequently, the pump capacitors CA11-CA14 are being charged while the DC capacitors CAZ1-CAZ4 are being discharged.

The voltage stress across the second pump-capacitor CA12 and the second DC capacitor CAZ2 is two volts while the voltage stress across each remaining capacitor is one volt. Consequently, the maximum voltage stress is two volts with a fairly uniform distribution of voltage stress among the pump capacitors CA11-CA14 and the DC capacitors CAZ1-CAZ4.

Figure 6A:
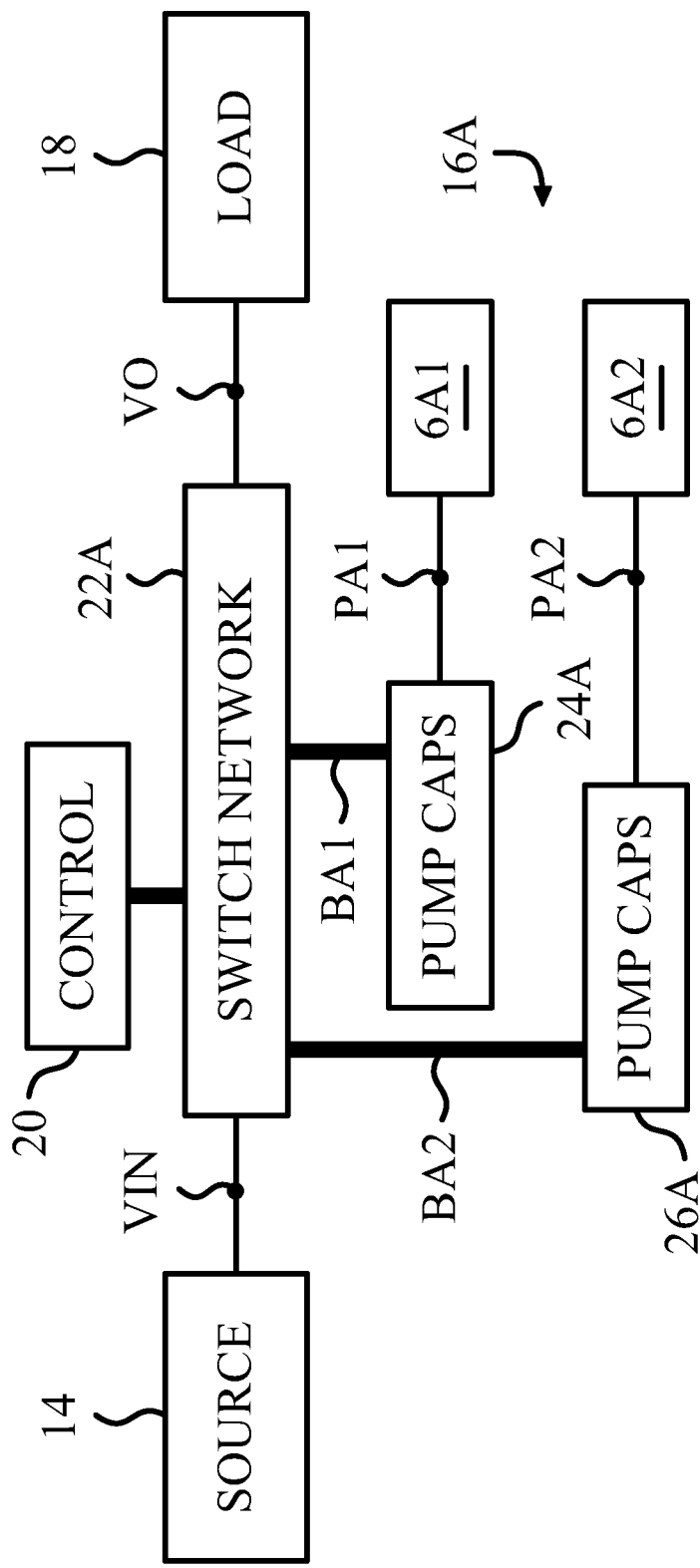
FIG. 6A shows an alternative block diagram of a single-phase cascade multiplier.

A block diagram of another single-phase cascade multiplier 16A is constructed by replacing the DC capacitor network 28A in FIG. 5A with a second pump-capacitor network 26A and a second phase pump 6A2 as illustrated FIG. 6A. In addition to the second pump-capacitor network 26A and the second phase pump 6A2, the resulting single-phase cascade multiplier 16A includes a switch network 22A, a first pump-capacitor network 24A, and a first phase pump 6A1. Additionally, a controller 20 may be used to generate the appropriate control signals.

The input of the switch network 22A is coupled with a voltage source 14 while the output of the switch network 22A is coupled with a load 18. The switch network 22A includes a string of switches connected in series. At least one capacitor is coupled with a node between adjacent switches in the switch network 22A.

In the first pump-capacitor network 24A, one side of each pump capacitor is coupled with the switch network 22A through a first pump bus BA1. The other side of each pump capacitor in the first pump-capacitor network 24A is coupled with the first phase pump 6A1 at a first pump-node PAL Similarly, in the second pump-capacitor network 26A, one side of each pump capacitor is coupled with the switch network 22A through a second pump bus BA2. The other side of each pump capacitor in the second pump-capacitor network 26A is coupled with the second phase pump 6A2 at a second pump-node PA2.

The first and second phase pumps 6A1, 6A2 have a first state and a second state. In the first state, the output of the first phase pump 6A1 is low and the output of the second phase pump 6A2 is high. In the second state, the output of the first phase pump 6A1 is high and the output of the second phase pump 6A2 is low. During operation, the phase pumps 6A1, 6A2 cycle between the first state and the second state at a specific frequency.

The switch network 22A, the first phase pump 6A1, and the second phase pump 6A2 are synchronized such that packages of charge are shuttled along the switch network 22A as the first and second pump-capacitor networks 24A, 26A are repeatedly being charged and discharged by the first and second phase pumps 6A1, 6A2, respectively. Charge transfers back and forth between the first pump-capacitor network 24A and the second pump-capacitor network 26A. It takes multiple cycles for the initial charge from the voltage source 14 to reach the load 18.

The single-phase cascade multiplier 16A shown in FIG. 6A is a generalization of the cascade multiplier 16A in FIG. 1B. Each component in FIG. 6A corresponds to a counterpart in FIG. 1B. The switch network 22A in FIG. 6A corresponds to the series connection of diodes D1-D7 in FIG. 1B. The first pump-capacitor network 24A in FIG. 6A corresponds to the parallel configuration of pump capacitors CA11-CA13 in FIG. 1B. The second pump-capacitor network 26A in FIG. 6A corresponds to the parallel configuration of pump capacitors CA21-CA23 in FIG. 1B. Lastly, the first and second phase pumps 6A1, 6A2 in FIG. 6A are not shown in FIG. 1B.

The diodes D1-D7 in FIG. 1B are specific implementations of switches. A diode has an on-state and an off-state, as does a switch. To produce a more general representation, the diodes D1-D7 in FIG. 1B can be replaced by switches. Each switch needs to be controlled properly for the cascade multiplier 16A to operate.

Figure 6B:
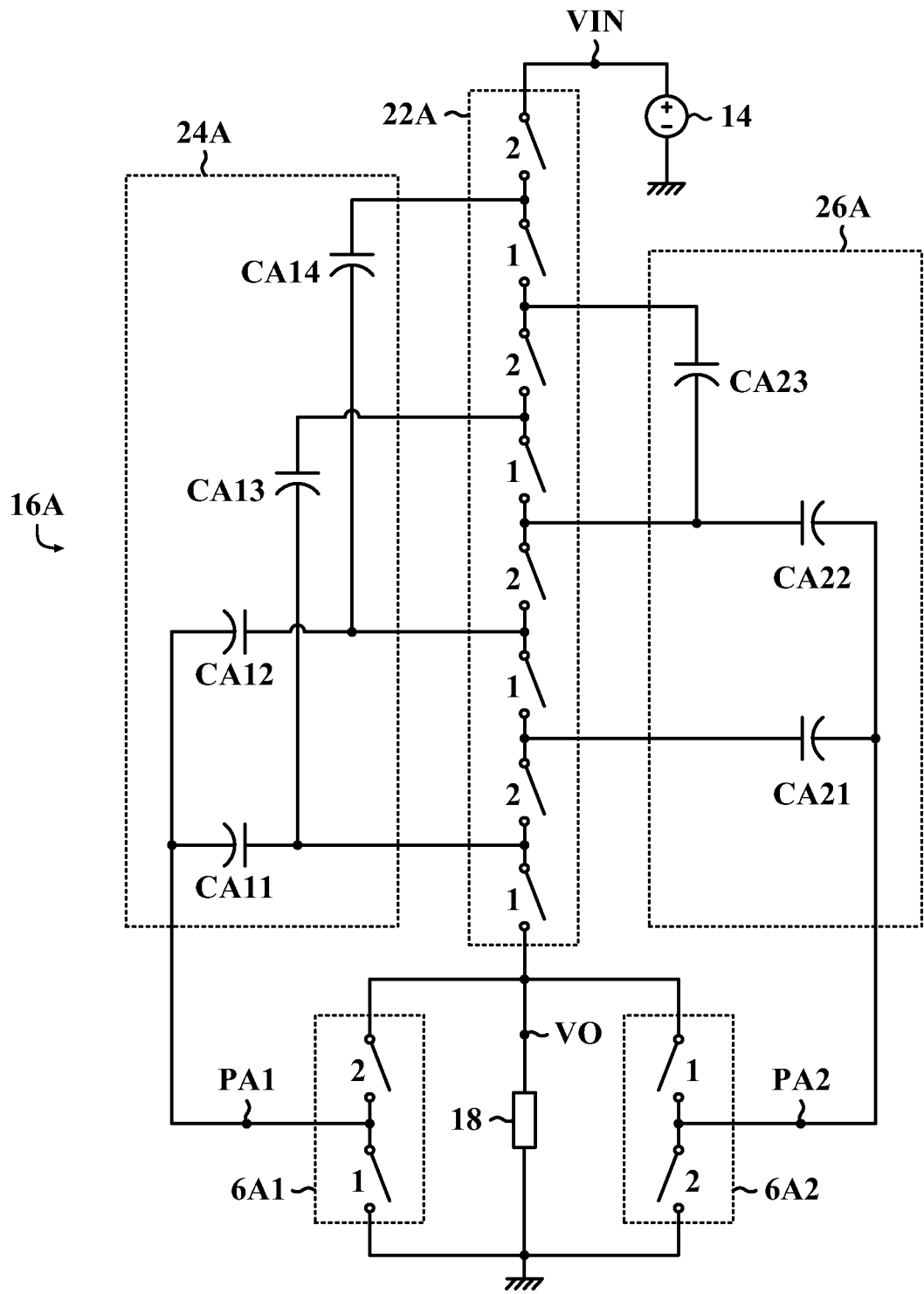
FIG. 6B shows a particular implementation of the cascade multiplier shown in FIG. 6A.

FIG. 6B is an implementation of the cascade multiplier 16A illustrated more generally in FIG. 6A. The cascade multiplier 16A receives an input voltage VIN from the voltage source 14 and produces an output voltage VO that is one-eighth of the input voltage VIN. The first pump-capacitor network 24A utilizes the capacitor network configuration shown in FIG. 4C while the second pump-capacitor network 26A utilizes the capacitor network configuration shown in FIG. 2C. The first pump-capacitor network 24A includes first, second, third, and fourth pump-capacitors CA11, CA12, CA13, CA14. Likewise, the second pump-capacitor network 26A includes fifth, sixth, and seventh pump capacitors CA21, CA22, CA23.

All of the devices in the switch network 22A, the first phase pump 6A1, and the second phase pump 6A2 are implemented using switches. The first and second phase pumps 6A1, 6A2 cycle between first and second intervals at a specific frequency. During the first interval, the voltage at the first pump-node PA1 is ground and the voltage at the second pump-node PA2 is the output voltage VO. In contrast, during the second interval, the voltage at the first pump-node PA1 is the output voltage VO and the voltage at the second pump-node PA2 is ground.

Assuming the input voltage VIN is equal to eight volts, the operation of the circuit is as follows. During the first interval, the switches labeled "1" are closed, the switches labeled "2" are open, the voltage at the first pump-node PA1 is zero volts, and the voltage at the second pump-node PA2 is one volt. As a result, the pump capacitors CA11-CA14 are being discharged while the pump capacitors CA21-CA23 are being charged.

During the second interval following the first interval, the switches labeled "1" are open, the switches labeled "2" are closed, the voltage at the first node PA1 is one volt, and the voltage at the second node PA2 is zero volts. Consequently, the pump capacitors CA11-CA14 are being charged while the pump capacitors CA21-CA23 are being discharged.

The voltage stress across the first, second, fifth, and seventh pump capacitors CAR CA12, CA21, CA23 is one volt, three volts, two volts, and two volts, respectively. While the voltage stress across each remaining pump capacitor is four volts. Consequently, the maximum voltage stress is four volts with a moderate distribution of voltage stress among the pump capacitors.

In the single-phase cascade multipliers 16A illustrated in FIGS. 5A, 6A, there are periods of time during which the voltage source 14 is not coupled with the load 18. However, if two single-phase cascade multipliers 16A are operated in parallel and one hundred and eighty degrees out of phase, then the voltage source 14 will always be coupled with the load 18 at any given time. This configuration is referred to as a two-phase or dual-phase cascade multiplier 16A.

Figure 7A:
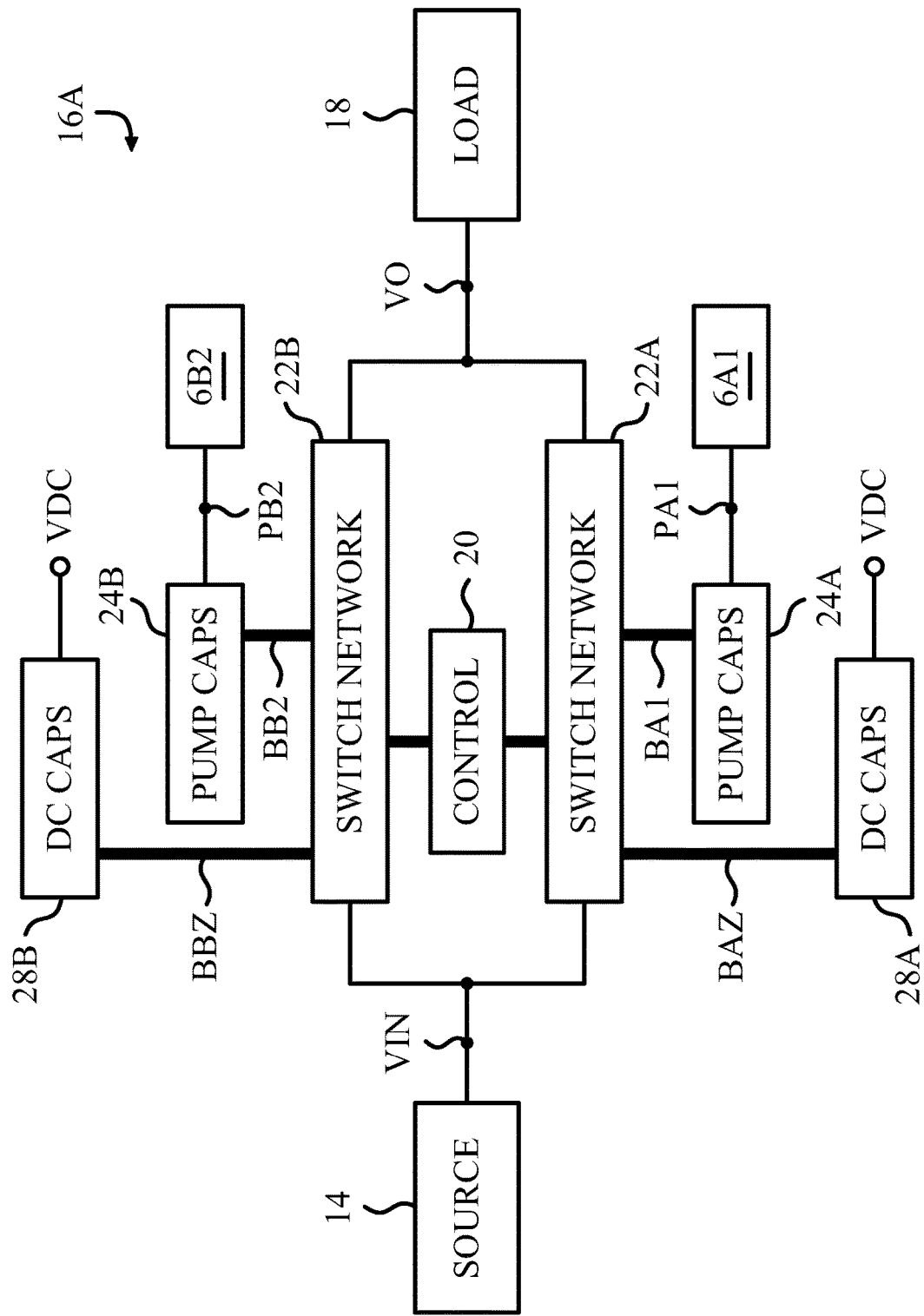
FIG. 7A shows a block diagram of a dual-phase cascade multiplier.

Based upon the single-phase cascade multiplier 16A in FIG. 5A, a dual-phase cascade multiplier 16A can be constructed as shown in FIG. 7A. The dual-phase cascade multiplier 16A includes a first switch network 22A, a second switch network 22B, a first pump-capacitor network 24A, a second pump-capacitor network 24B, a first phase pump 6A1, a second phase pump 6B2, a first DC capacitor network 28A, and a second DC capacitor network 28B. Additionally, a controller 20 may be used to generate the appropriate control signals.

The first pump-capacitor network 24A is coupled with the first phase pump 6A1 at a first pump-node PA1 and with the first switch network 22A through a first pump bus BA1. Similarly, the second pump-capacitor network 24B is coupled with the second phase pump 6B2 at a second pump-node PB2 and with the second switch network 22B through a second pump bus BB2. Furthermore, the first DC capacitor network 28A is coupled with the first switch network 22A through a first DC bus BAZ and with a first DC voltage. Meanwhile, the second DC capacitor network 28B is coupled with the second switch network 22B through a second DC bus BBZ and with a second DC voltage. As before, one convenient choice of the first and/or second DC voltage comes from the output of the cascade multiplier 16A.

The output of the first phase pump 6A1 is provided at the first pump-node PA1 and the output of the second phase pump 6B2 is provided at the second pump-node PB2. The signal at the first pump-node PA1 and the signal at the second pump-node PB2 are one hundred and eighty degrees out of phase. Consequently, whenever the first pump-node PA1 is high, the second pump-node PB2 is low, and vice versa.

Figure 7B:
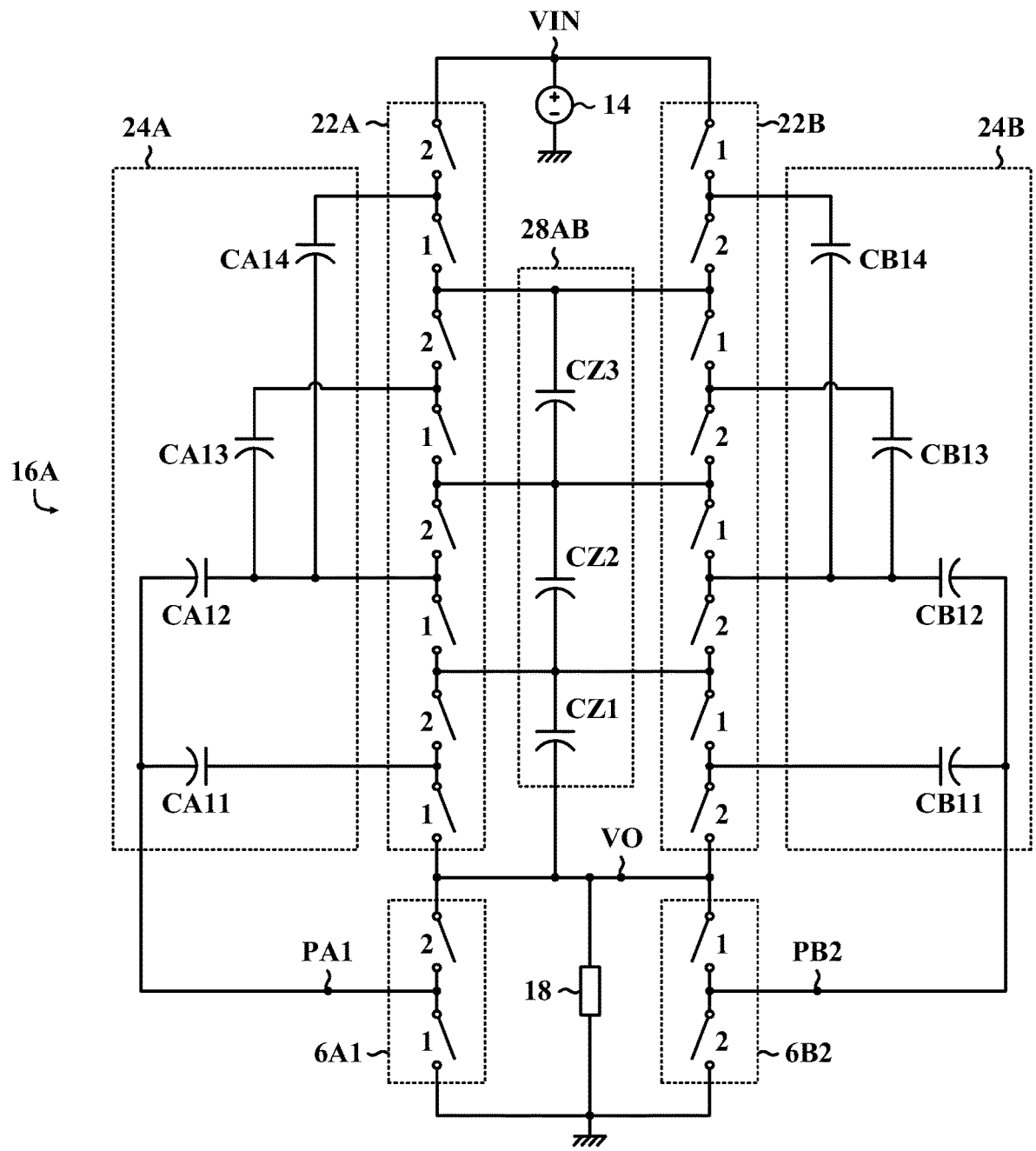
FIG. 7B shows a particular implementation of the cascade multiplier shown in FIG. 7A.

FIG. 7B is an implementation of the dual-phase cascade multiplier 16A illustrated in FIG. 7A that utilizes the capacitor network configuration shown in FIG. 4B. The first pump-capacitor network 24A includes first, second, third, and fourth pump-capacitors CA11, CA12, CA13, CA14. Likewise, the second pump-capacitor network 24B includes fifth, sixth, seventh, and eighth pump capacitors CB11, CB12, CB13, CB14.

The first and second DC capacitor networks 28A, 28B in FIG. 7A can be merged if the voltage across the corresponding DC capacitors inside the first and second DC capacitor networks 28A, 28B are at the same DC values. Therefore, the first and second DC capacitor networks 28A, 28B in FIG. 7A are replaced by a third DC capacitor network 28AB in FIG. 7B. The third DC capacitor network 28AB includes first, second, and third DC capacitors CZ1, CZ2, CZ3. Similar to the first and second DC capacitor networks 28A, 28B, the third DC capacitor network 28AB generates DC voltage levels.

The dual-phase cascade multiplier 16A receives an input voltage VIN from a voltage source 14 and maintains an output voltage VO that is one-fifth of the input voltage VIN. All of the devices in the first switch network 22A, the second switch network 22B, the first phase pump 6A1, and the second phase pump 6B2 are implemented using switches. The first and second phase pumps 6A1, 6B2 use the output voltage VO and ground to produce a voltage with first and second intervals repeated at a specific frequency.

Assuming the input voltage VIN is equal to five volts, the operation of the circuit is as follows. During the first interval, the switches labeled "1" are closed, the switches labeled "2" are open, the voltage at the first pump-node PA1 is zero volts, and the voltage at the second pump-node PB2 is one volt. As a result, the pump capacitors CA11-CA14 are being discharged while the pump capacitors CB11-CB14 are being charged. Ideally, the DC capacitors CZ1-CZ3 are neither being charged nor being discharged because the discharging currents of the first, second, third, and fourth pump-capacitors CA11, CA12, CA13, CA14 match the charging currents of the fifth, sixth, seventh, and eighth pump capacitors CB11, CB12, CB13, CB14, respectively.

During the second interval following the first interval, the switches labeled "1" are open, the switches labeled "2" are closed, the voltage at the first pump-node PA1 is one volt, and the voltage at the second pump-node PB2 is zero volts. Consequently, the pump capacitors CA11-CA14 are being charged while the pump capacitors CB11-CB14 are being discharged. Ideally, the DC capacitors CZ1-CZ3 are neither being charged nor being discharged because the charging currents of the first, second, third, and fourth pump-capacitors CA11, CA12, CA13, CA14 match the discharging currents of the fifth, sixth, seventh, and eighth pump capacitors CB11, CB12, CB13, CB14, respectively.

The voltage stress across the first, third, fifth, and seventh pump capacitors CA11, CA13, CB11, CB13 is one volt while the voltage stress across each remaining capacitor is two volts. Consequently, the maximum voltage stress is two volts with a fairly uniform distribution of voltage stress among the pump capacitors.

Figure 8A:
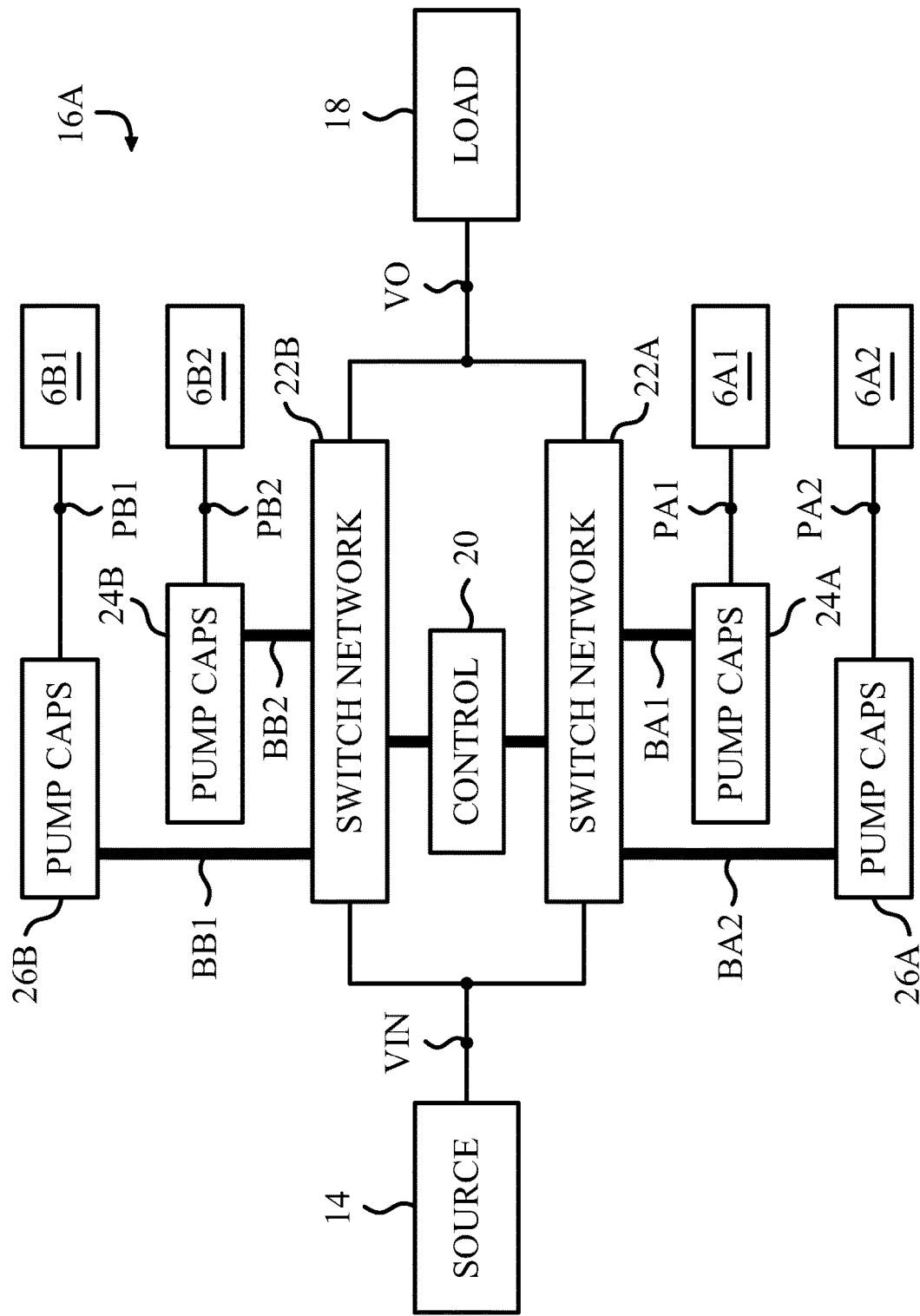
FIG. 8A shows an alternative block diagram of a dual-phase cascade multiplier.

Another dual-phase cascade multiplier 16A is shown in FIG. 8A. The implementation in FIG. 8A is based upon the single-phase cascade multiplier 16A in FIG. 6A. Therefore, the dual-phase cascade multiplier 16A includes a first switch network 22A, a second switch network 22B, a first pump-capacitor network 24A, a second pump-capacitor network 26A, a third pump-capacitor network 24B, a fourth pump-capacitor network 26B, a first phase pump 6A1, a second phase pump 6A2, a third phase pump 6B2, and a fourth phase pump 6B1. Additionally, a controller 20 may be used to generate the appropriate control signals.

The first pump-capacitor network 24A is coupled with the first phase pump 6A1 at a first pump-node PA1 and with the first switch network 22A through a first pump bus BA1. Similarly, the second pump-capacitor network 26A is coupled with the second phase pump 6A2 at a second pump-node PA2 and with the first switch network 22A through a second pump bus BA2. Furthermore, the third pump-capacitor network 24B is coupled with the third phase pump 6B2 at a third pump node PB2 and with the second switch network 22B through a third pump bus BB2. Meanwhile, the fourth pump-capacitor network 26B is coupled with the fourth phase pump 6B1 at a fourth pump node PB1 and with the second switch network 22B through a fourth pump bus BB1.

The outputs of the first, second, third, and fourth phase pumps 6A1, 6A2, 6B2, 6B1 are provided at the first, second, third, and fourth pump nodes PA1, PA2, PB2, PB1, respectively. The signals at the first and second pump-nodes PA1, PA2 are opposite in phase. Similarly, the signals at the third and fourth pump nodes PB2, PB1 are opposite in phase. However, the signals at the first and fourth pump nodes PA1, PB1 are in phase. Therefore, whenever the first and fourth pump nodes PA1, PB1 are high, the second and third pump nodes PA2, PB2 are low, and vice versa. Furthermore, because of the phase alignment, the first and fourth phase pumps 6A1, 6B1 can be the same physical pump or different pumps that are in phase. Likewise, the second and third phase pumps 6A2, 6B2 can be the same physical pump or different pumps that are in phase.

Figure 8B:
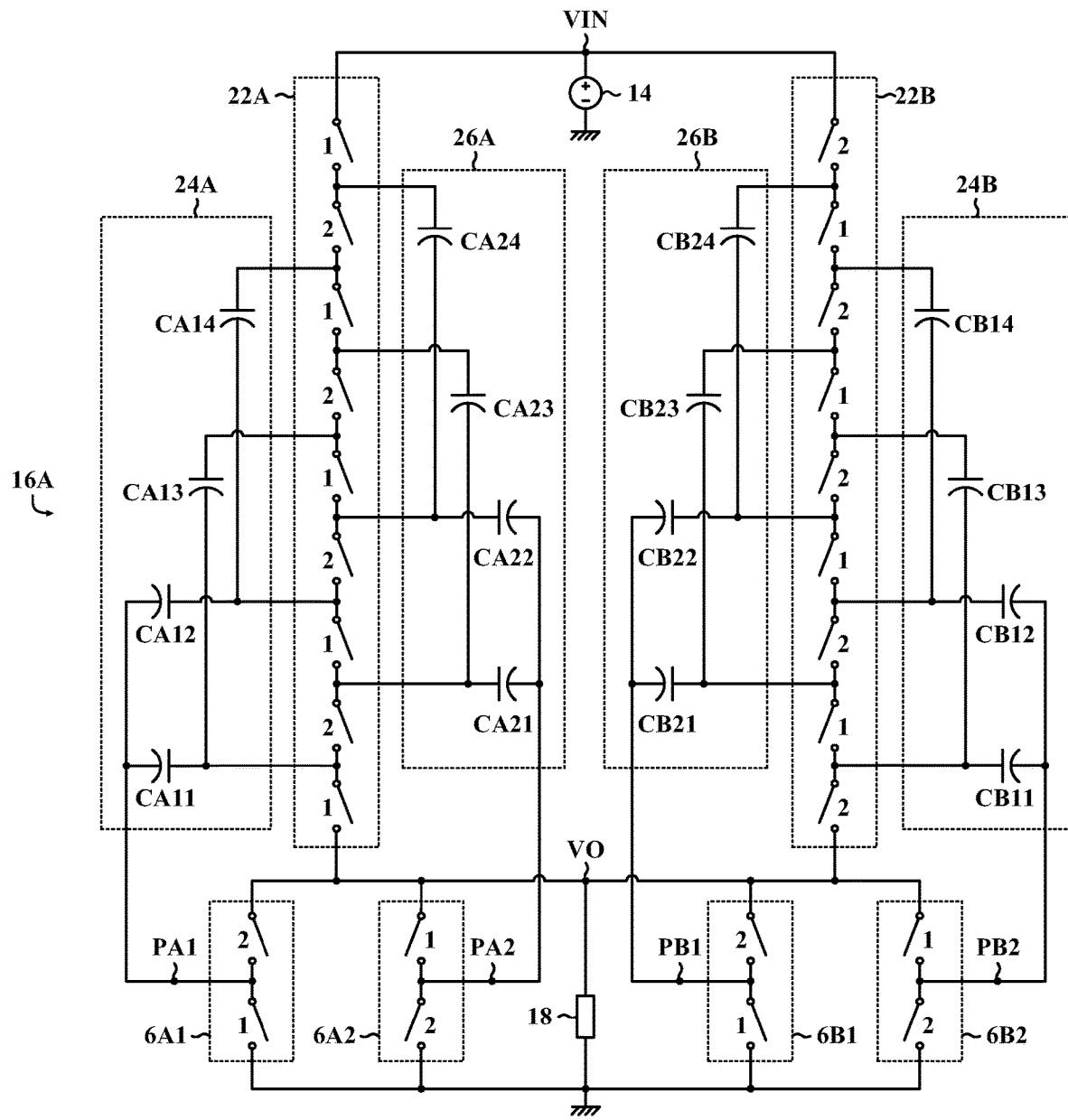
FIG. 8B shows a particular implementation of the cascade multiplier shown in FIG. 8A.

FIG. 8B is an implementation of the dual-phase cascade multiplier 16A illustrated in FIG. 8A that utilizes the capacitor network configuration shown in FIG. 4C. The first pump-capacitor network 24A includes first, second, third, and fourth pump-capacitors CA11, CA12, CA13, CA14. The second pump-capacitor network 26A includes fifth, sixth, seventh, and eight pump capacitors CA21, CA22, CA23, CA24. The third pump-capacitor network 24B includes ninth, tenth, eleventh, and twelfth pump capacitors CB11, CB12, CB13, CB14. Lastly, the fourth pump-capacitor network 26B includes thirteenth, fourteenth, fifteenth, and sixteenth pump capacitors CB21, CB22, CB23, CB24.

The dual-phase cascade multiplier 16A receives an input voltage from a voltage source 14 and maintains an output voltage VO that is one-ninth of the input voltage VIN. All of the devices in the first switch network 22A, the second switch network 22B, and the phase pumps 6A1, 6A2, 6B2, 6B1 are implemented using switches. The four phase pumps 6A1, 6A2, 6B2, 6B1 use the output voltage VO and ground to produce voltages with first and second intervals repeated at a specific frequency.

Assuming the input voltage VIN is equal to nine volts, the operation of the circuit is as follows. During the first interval, the switches labeled "1" are closed, the switches labeled "2" are open, the voltage at the first and fourth pump nodes PA1, PB1 is zero volts, and the voltage at the second and third pump nodes PA2, PB2 is one volt. As a result, the pump capacitors CA11-CA14, CB21-CB24 are being discharged while the pump capacitors CA21-CA24, CB11-CB14 are being charged.

During the second interval following the first interval, the switches labeled "1" are open, the switches labeled "2" are closed, the voltage at the first and fourth pump nodes PA1, PB1 is one volt, and the voltage at the second and third pump nodes PA2, PB2 is zero volts. Consequently, the pump capacitors CA11-CA14, CB21-CB24 are being charged while the pump capacitors CA21-CA24, CB11-CB14 are being discharged.

The voltage stress across the first and ninth pump capacitors CAR CB11 is one volt. The voltage stress across the second and tenth pump capacitors CA12, CB12 is three volts. The voltage stress across the fifth and thirteenth pump capacitors CA21, CB21 is two volts. Lastly, the voltage stress across each remaining pump capacitor is four volts. Consequently, the maximum voltage stress is four volts with a moderate distribution of voltage stress among the pump capacitors.

In general, the switches included within a first and second switch network 22A, 22B have an on-state and an off-state. Likewise, the switches included within a first phase pump 6A1, a second phase pump 6A2, a third phase pump 6B2, and so on, also have an on-state and an off-state. In the on-state, current flows through the switch, whereas in the off-state, the current through the switch is suppressed. Examples of such switches include diodes, transistors, vacuum tubes, and micro-mechanical relays.

Even though FIGS. 5A, 6A, 7A, and 8A illustrate four types of switched capacitor converters within the cascade multiplier family, there are other possible variations. For instance, one of ordinary skill in the art would appreciate the possibility of increasing the number of phases beyond two or dynamically reconfiguring the transformation ratio of the cascade multiplier 16A.

Additionally, other circuit implementations in addition to those shown in FIGS. 5B, 6B, 7B, and 8B are possible. For example, each circuit implementation was designed to convert a higher input voltage VIN to a lower output voltage VO. However, one of ordinary skill in the art would understand how to create corresponding circuit implementations that convert a lower input voltage VIN to a higher output voltage VO.

Furthermore, a dead-time interval can also be included between the first interval and the second interval and subsequently between the second interval and the first interval. To ensure a clean transition, all of the switches are in the off-state during the dead-time interval. This technique is often referred to as "break before make".

Various features, aspects, and embodiments of switched capacitor converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expression which have been employed herein are used as terms of description and not of limitation. There is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

Having described the invention, and a preferred embodiment thereof, what is claimed as new and secured by Letters Patent is:

1. An apparatus to cause a capacitor network that comprises a plurality of capacitors that are to be interconnected by a switching network of said apparatus to cause a voltage at a first port thereof to be a multiple of a voltage at a second port thereof, wherein, among said capacitors are a first capacitor, a second capacitor, and a third capacitor, wherein, throughout operation of said switching network, said first capacitor has a positive terminal that is to remain DC coupled to a first node, said second capacitor has a positive terminal that is to be DC coupled to a second node, said third capacitor has a negative terminal that is to remain DC coupled to said positive terminal of said second capacitor and a positive terminal that is to remain DC coupled to a third node, and said first and second capacitors have negative terminals that are to remain DC coupled to a fourth node that is one of said second port and a phase pump, wherein said negative terminal of said third capacitor is to be coupled to said fourth node without being DC coupled to said fourth node, and wherein said capacitor network further comprises a fourth capacitor having a negative terminal that is to be DC coupled to said positive terminal of said second capacitor and a positive terminal that is to be DC coupled to a fifth node.

2. The apparatus of claim 1, wherein said capacitor network and said switches define a single-phase voltage multiplier, wherein said voltage multiplier, in operation, is to transition between a first interval and a second interval that is separated from said first interval by a dead-time interval, wherein, during said first interval, said voltage multiplier is to couple a voltage source to a load, and wherein, during said second interval, said voltage source and said load are to be decoupled.

3. The apparatus of claim 1, wherein said switching network comprises switches to implement a phase pump that causes charge to be shuttled along said switching network as said capacitor network is repeatedly charged and discharged by said phase pump.

4. The apparatus of claim 1, wherein said capacitor network and said switches define a multi-phase voltage multiplier, wherein said voltage multiplier, in operation, is to transition between a first interval and a second interval that is separated from said first interval by a dead-time interval, wherein, during said first interval, said voltage multiplier is to couple a voltage source to a load, and wherein, during said second interval, said multiplier is to couple said voltage source to said load.

5. The apparatus of claim 1, wherein said capacitor network comprises a pump capacitor network that is to cause voltage transformation between said first and second ports and a DC capacitor network that is to serve as intermediate storage for said pump capacitor network, and wherein said DC capacitor network is to connect between a DC voltage and said switching network.

6. An apparatus to cause a capacitor network that comprises a plurality of capacitors that are to be interconnected by a switching network of said apparatus to cause a voltage at a first port thereof to be a multiple of a voltage at a second port thereof, wherein, among said capacitors are a first capacitor, a second capacitor, and a third capacitor, wherein, throughout operation of said switching network, said first capacitor has a positive terminal that is to remain DC coupled to a first node, said second capacitor has a positive terminal that is to be DC coupled to a second node, said third capacitor has a negative terminal that is to remain DC coupled to said positive terminal of said second capacitor and a positive terminal that is to remain DC coupled to a third node, and said first and second capacitors have negative terminals that are to remain DC coupled to a fourth node that is one of said second port and a phase pump, wherein said negative terminal of said third capacitor is to be coupled to said fourth node without being DC coupled to said fourth node, wherein said capacitor network and said switches define a multi-phase voltage multiplier, wherein said voltage multiplier, in operation, is to transition between a first interval and a second interval that is separated from said first interval by a dead-time interval, wherein, during said first interval, said voltage multiplier is to couple a voltage source to a load, and wherein, during said second interval, said multiplier is to couple said voltage source to said load.

7. The apparatus of claim 6, wherein said capacitor network further comprises a fourth capacitor having a negative terminal that is to remain DC coupled to said positive terminal of said third capacitor and a positive terminal that, during operation of said switching network, is to remain DC coupled to a fifth node.

8. The apparatus of claim 6, wherein said capacitor network further comprises a fourth capacitor having a negative terminal that is to be DC coupled to said positive terminal of said first capacitor and a positive terminal that is to be DC coupled to a fifth node.

9. The apparatus of claim 6, wherein said negative terminal of said third capacitor has a negative terminal that is DC coupled to said second node.

10. The apparatus of claim 6, wherein said capacitor network further comprises a fourth capacitor having a negative terminal that is to be DC coupled to said positive terminal of said second capacitor and a positive terminal that is to be DC coupled to a fifth node.

11. The apparatus of claim 6, wherein said capacitor network comprises a pump capacitor network that is to cause voltage transformation between said first and second ports and a DC capacitor network that is to serve as intermediate storage for said pump capacitor network, and wherein said DC capacitor network is to connect between a DC voltage and said switching network.

12. An apparatus to cause a capacitor network that comprises a plurality of capacitors that are to be interconnected by a switching network of said apparatus to cause a voltage at a first port thereof to be a multiple of a voltage at a second port thereof, wherein, among said capacitors are a first capacitor, a second capacitor, and a third capacitor, wherein, throughout operation of said switching network, said first capacitor has a positive terminal that is to remain DC coupled to a first node, said second capacitor has a positive terminal that is to be DC coupled to a second node, said third capacitor has a negative terminal that is to remain DC coupled to said positive terminal of said second capacitor and a positive terminal that is to remain DC coupled to a third node, and said first and second capacitors have negative terminals that are to remain DC coupled to a fourth node that is one of said second port and a phase pump, wherein said negative terminal of said third capacitor is to be coupled to said fourth node without being DC coupled to said fourth node, wherein said capacitor network comprises a pump capacitor network that is to cause voltage transformation between said first and second ports and a DC capacitor network that is to serve as intermediate storage for said pump capacitor network, and wherein said DC capacitor network is to connect between a DC voltage and said switching network.

13. The apparatus of claim 12, wherein said capacitor network further comprises a fourth capacitor having a negative terminal that is to remain DC coupled to said positive terminal of said third capacitor and a positive terminal that, during operation of said switching network, is to remain DC coupled to a fifth node.

14. The apparatus of claim 12, wherein said capacitor network further comprises a fourth capacitor having a negative terminal that is to be DC coupled to said positive terminal of said second capacitor and a positive terminal that is to be DC coupled to a fifth node.

15. The apparatus of claim 12, wherein said capacitor network further comprises a fourth capacitor having a negative terminal that is to be DC coupled to said positive terminal of said first capacitor and a positive terminal that is to be DC coupled to a fifth node.

16. The apparatus of claim 12, wherein said capacitor network and said switches define a multi-phase voltage multiplier, wherein said voltage multiplier, in operation, is to transition between a first interval and a second interval that is separated from said first interval by a dead-time interval, wherein, during said first interval, said voltage multiplier is to couple a voltage source to a load, and wherein, during said second interval, said multiplier is to couple said voltage source to said load.

17. An apparatus comprising a voltage multiplier to cause a voltage at a first port thereof to be a multiple of a voltage at a second port thereof, said voltage multiplier comprising a first plurality of switches, a first phase-pump, and a plurality of capacitors, said plurality of capacitors to be coupled to said first phase-pump and comprising a first capacitor-network that comprises first, second, and third capacitors, each of which has a first terminal and a second terminal, said first terminals of said capacitors to be coupled to selected nodes between pairs of said switches, wherein said first plurality of switches comprises a first switch having a terminal that is to be connected to said first port and a second switch having a terminal that is to be connected to said second port, wherein said second port is a bottom node, and wherein, throughout operation of said voltage multiplier, said first capacitor is to remain coupled to said bottom node through said second capacitor, a second terminal of said second capacitor is to remain DC coupled to said bottom node, and a second terminal of said third capacitor is to remain DC coupled to said bottom node.

18. The apparatus of claim 17, wherein said voltage multiplier is a multi-phase voltage multiplier.

19. The apparatus of claim 17, wherein said plurality of capacitors comprises a second capacitor-network and wherein said voltage multiplier further comprises a second phase pump that is to be coupled to said second capacitor-network.

20. The apparatus of claim 19, wherein said second capacitor-network comprises a set of capacitors, each capacitor having a first terminal and a second terminal, said first terminals to be coupled to corresponding ones of selected nodes between pairs of said switches, wherein said set of capacitors comprises first and second capacitors, second terminals of which are to be DC coupled to said second phase-pump, and a third capacitor to be coupled to said second phase-pump through said first capacitor.

21. The apparatus of claim 20, wherein said voltage multiplier further comprises a second plurality of switches, one of which is to be coupled to said first port and another of which is to be coupled to said second port, said second plurality of switches comprising a first switch having a first terminal and a second terminal, and a second switch having a first terminal and a second terminal, said first terminal of said second switch to be coupled to said second terminal of said first switch, wherein said voltage multiplier comprises a third capacitor-network network and a third-phase pump.

22. The apparatus of claim 21, wherein said third capacitor-network comprises a set of capacitors, each capacitor having a first terminal and a second terminal, said first terminals to be coupled to corresponding ones of selected nodes between pairs of said switches from said second plurality of switches, wherein said set of capacitors from said third charge storage network comprises first and second capacitors, second terminals of which are to be DC coupled to said third phase pump, and a third capacitor to be coupled to said third phase pump through said first capacitor.

* * * * *